(12) United States Patent
Green

(10) Patent No.: US 9,071,585 B2
(45) Date of Patent: Jun. 30, 2015

(54) COPY OFFLOAD FOR DISPARATE OFFLOAD PROVIDERS

(71) Applicant: Microsoft Corporation, Redmond, WA (US)

(72) Inventor: Dustin L. Green, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 13/711,637

(22) Filed: Dec. 12, 2012

(65) Prior Publication Data

US 2014/0164571 A1 Jun. 12, 2014

(51) Int. Cl.
- G06F 15/16 (2006.01)
- H04L 29/08 (2006.01)
- H04L 29/06 (2006.01)

(52) U.S. Cl.
CPC ............ *H04L 67/06* (2013.01); *H04L 67/1095* (2013.01); *H04L 67/141* (2013.01); *H04L 63/08* (2013.01)

(58) Field of Classification Search
CPC ...... H04L 63/08; H04L 67/06; H04L 67/1095
USPC .................................................. 709/217–219
See application file for complete search history.

(56) References Cited

U.S. PATENT DOCUMENTS

| | | | |
|---|---|---|---|
| 5,043,866 A | 8/1991 | Myre, Jr. et al. | |
| 5,668,958 A | 9/1997 | Bendert et al. | |
| 5,678,021 A | 10/1997 | Pawate et al. | |
| 6,141,705 A | 10/2000 | Anand et al. | |
| 6,161,145 A | 12/2000 | Bainbridge et al. | |
| 6,275,867 B1 | 8/2001 | Bendert et al. | |
| 6,304,983 B1 | 10/2001 | Lee et al. | |
| 6,385,701 B1 | 5/2002 | Krein et al. | |
| 6,434,620 B1 | 8/2002 | Boucher et al. | |
| 6,697,881 B2 | 2/2004 | Cochran | |
| 6,785,743 B1 | 8/2004 | Sun et al. | |
| 7,016,982 B2 | 3/2006 | Basham | |

(Continued)

FOREIGN PATENT DOCUMENTS

| | | |
|---|---|---|
| CN | 100343793 C | 10/2007 |
| CN | 101278270 A | 10/2008 |

(Continued)

OTHER PUBLICATIONS

"Offloaded Data Transfer (ODX) with Intelligent Storage Arrays", Retrieved at <<http://feishare.com/attachments/article/297/windows-offloaded-data-transfer.pdf>>, Feb. 28, 2012, pp. 14.

(Continued)

*Primary Examiner* — Mohamed Wasel
(74) *Attorney, Agent, or Firm* — John Jardine; Kate Drakos; Micky Minhas

(57) ABSTRACT

Aspects of the subject matter described herein relate to offload technology. In aspects, a source offload provider may transfer bulk data to a destination offload provider even if the offload providers are different and independent from each other and have no prior knowledge of each other. In preparation for transferring bulk data, trust may be extended to the offload providers. After authentication, the offload providers may transfer all or a portion of the bulk data over a secure channel without the data traversing the initiator of the transfer.

20 Claims, 8 Drawing Sheets

(56) References Cited

U.S. PATENT DOCUMENTS

| | | | |
|---|---|---|---|
| 7,107,385 B2 | 9/2006 | Rajan et al. | |
| 7,373,548 B2 | 5/2008 | Reinhardt et al. | |
| 7,383,405 B2 | 6/2008 | Vega et al. | |
| 7,406,501 B2 | 7/2008 | Szeto et al. | |
| 7,475,167 B2 | 1/2009 | Wunderlich et al. | |
| 7,475,199 B1 | 1/2009 | Bobbitt et al. | |
| 7,565,526 B1 | 7/2009 | Shaw et al. | |
| 7,567,985 B1 | 7/2009 | Comay et al. | |
| 7,613,786 B2 | 11/2009 | Nakamura et al. | |
| 7,633,955 B1 | 12/2009 | Saraiya et al. | |
| 7,676,607 B2 | 3/2010 | Jung et al. | |
| 7,694,105 B2 | 4/2010 | Sanvido | |
| 7,730,034 B1 | 6/2010 | Deflaux et al. | |
| 7,730,231 B2 | 6/2010 | Weisser et al. | |
| 7,801,852 B2 | 9/2010 | Wong et al. | |
| 7,814,058 B2 | 10/2010 | Beck | |
| 7,831,720 B1 | 11/2010 | Noureddine et al. | |
| 7,886,115 B2 | 2/2011 | Sanvido et al. | |
| 7,890,717 B2 | 2/2011 | Tsuboki et al. | |
| 7,895,445 B1 | 2/2011 | Albanese et al. | |
| 8,042,163 B1 | 10/2011 | Karr et al. | |
| 8,082,231 B1 | 12/2011 | Mcdaniel et al. | |
| 8,213,583 B2* | 7/2012 | Finogenov | 379/93.02 |
| 8,239,674 B2 | 8/2012 | Lee et al. | |
| 8,250,267 B2 | 8/2012 | Logan | |
| 8,261,005 B2 | 9/2012 | Flynn et al. | |
| 8,261,267 B2 | 9/2012 | Iwamatsu et al. | |
| 8,332,370 B2 | 12/2012 | Gattegno et al. | |
| 2002/0019788 A1 | 2/2002 | Stehle et al. | |
| 2002/0038296 A1 | 3/2002 | Margolus et al. | |
| 2002/0178335 A1 | 11/2002 | Selkirk et al. | |
| 2002/0198788 A1 | 12/2002 | Moskowitz et al. | |
| 2003/0058238 A1 | 3/2003 | Doak et al. | |
| 2004/0049603 A1 | 3/2004 | Boyd et al. | |
| 2004/0205202 A1 | 10/2004 | Nakamura et al. | |
| 2004/0267672 A1 | 12/2004 | Gray et al. | |
| 2005/0131875 A1 | 6/2005 | Riccardi et al. | |
| 2006/0218544 A1 | 9/2006 | Chakraborty et al. | |
| 2006/0230222 A1 | 10/2006 | Yamagami | |
| 2006/0294234 A1 | 12/2006 | Bakke et al. | |
| 2007/0055702 A1 | 3/2007 | Fridella et al. | |
| 2007/0260831 A1 | 11/2007 | Michael et al. | |
| 2008/0065835 A1 | 3/2008 | Iacobovici et al. | |
| 2008/0104039 A1* | 5/2008 | Lowson | 707/3 |
| 2008/0120470 A1 | 5/2008 | Dhamankar et al. | |
| 2008/0128484 A1 | 6/2008 | Spaeth et al. | |
| 2008/0140910 A1 | 6/2008 | Flynn et al. | |
| 2008/0147755 A1 | 6/2008 | Chapman | |
| 2008/0155223 A1 | 6/2008 | Hiltgen et al. | |
| 2008/0184273 A1 | 7/2008 | Sekar | |
| 2008/0235479 A1 | 9/2008 | Scales et al. | |
| 2009/0172665 A1 | 7/2009 | Tene et al. | |
| 2009/0198731 A1 | 8/2009 | Noonan, III | |
| 2009/0248835 A1 | 10/2009 | Panda et al. | |
| 2009/0249001 A1 | 10/2009 | Narayanan et al. | |
| 2009/0282101 A1 | 11/2009 | Lim et al. | |
| 2009/0300301 A1 | 12/2009 | Vaghani | |
| 2009/0327621 A1 | 12/2009 | Kliot et al. | |
| 2010/0042796 A1 | 2/2010 | Vasilevsky et al. | |
| 2010/0070725 A1 | 3/2010 | Prahlad et al. | |
| 2010/0083276 A1 | 4/2010 | Green et al. | |
| 2010/0094806 A1 | 4/2010 | Apostolides et al. | |
| 2010/0115184 A1 | 5/2010 | Chang | |
| 2010/0115208 A1 | 5/2010 | Logan | |
| 2010/0122248 A1 | 5/2010 | Robinson et al. | |
| 2010/0228913 A1 | 9/2010 | Czezatke et al. | |
| 2010/0235831 A1 | 9/2010 | Dittmer | |
| 2010/0241785 A1 | 9/2010 | Chen et al. | |
| 2010/0250630 A1 | 9/2010 | Kudo | |
| 2010/0306467 A1 | 12/2010 | Pruthi et al. | |
| 2011/0055406 A1 | 3/2011 | Piper et al. | |
| 2011/0072059 A1 | 3/2011 | Guarraci | |
| 2011/0075557 A1 | 3/2011 | Chowdhury et al. | |
| 2011/0197022 A1 | 8/2011 | Green et al. | |
| 2011/0214172 A1 | 9/2011 | Hermann et al. | |
| 2012/0079229 A1 | 3/2012 | Jensen et al. | |
| 2012/0079583 A1 | 3/2012 | Christiansen et al. | |
| 2012/0110281 A1 | 5/2012 | Green et al. | |
| 2012/0233434 A1 | 9/2012 | Starks et al. | |
| 2012/0233682 A1* | 9/2012 | Finogenov | 726/7 |
| 2012/0324560 A1 | 12/2012 | Matthew et al. | |
| 2013/0041985 A1 | 2/2013 | Christiansen et al. | |
| 2013/0179649 A1 | 7/2013 | Green et al. | |
| 2013/0179959 A1 | 7/2013 | Green et al. | |

FOREIGN PATENT DOCUMENTS

| | | |
|---|---|---|
| CN | 101622596 A | 1/2010 |
| EP | 2262164 A1 | 12/2010 |
| JP | 2010033206 A | 2/2010 |

OTHER PUBLICATIONS

Wu, et al., "Distributed Runtime Load-Balancing for Software Routers on Homogeneous Many-Core Processors", Retrieved at <<http://conferences.sigcomm.org/co-next/2010/Workshops/PRESTO/PRESTO_papers/01-Wu.pdf>>, Proc. of the ACM context workshop on programmable routers for extensible services of tomorrow (PRESTO), Nov. 30, 2010, pp. 6.

"Offloaded Data Transfer (ODX) with Intelligent Storage Arrays", Retrieved at <<http://feishare.com/attachments/article/297/windows-offloaded-data-transfer.pdf>>, Feb. 28, 2012, 14 pages.

"International Search Report & Written Opinion for PCT Application No. PCT/US2013/075212", Mailed Date: Apr. 25, 2014, Filed Date: Dec. 14, 2013, 10 pages.

International Search Report, Mailed Mar. 28, 2014, PCT/US2013/074509, Filed Dec. 13, 2013.

"ControlSphere Token Data Structure", Retrieved On: Nov. 18, 2011, Available at: http://www.securesystems.iv/HelpSystem/TokenDataManager.html.

"Deploying Virtual Hard Disk Images", Retrieved on: Dec. 8, 2010, Available at: https://technet.microsoft.conn/enus/library/dd363560(v=ws.10).aspx.

"Disk Cache Infrastructure Enhancements", Published On: Jun. 15, 2010, Available at: http://publib.boulder.ibm.com/infocenter/wasinfo/v6r1/index.jsp?topic=/com.ibm.websphere.express.doc/info/exp/ae/cdyn_diskcacheenhance.html.

"FSCTL_File_Level_Trim Control Code", Retrieved on: Aug. 16, 2013, Available at: https://msdn.microsoft.com/en-us/library/windows/hardware/hh451098(v=vs.85).aspx.

"How to Resize a Microsoft Virtual Hard Drive (VHD) File", Retrieved on: Aug. 16, 2013, Available at: http://www.howtogeek.com/50399/how-to-resize-a-nnicrosoft-virtual-hard-drive-vhd-file.

"Saving and Restoring ZFS Data", Retrieved on: Jul., 26, 2010, Available at: http://docs.huihoo.com/opensolaris/solaris-zfs-administration-guide/html/ch06s03.html.

"Storage_Offload_Token structure", Published On: Sep. 7, 2011, Available at: http://msdn.microsoft.com/enus/library/windows/hardware/hh451469%28v=vs.85%29.aspx.

"Trim/UNMAP Support in Windows Server 2012 & Hyper-V/VHDX", Published on: May 23, 2012, Available at: https://workinghardinit.wordpress.com/2012/05/23/trimunmap-support-in-windows-server-2012-hyper-vvhdx/.

"Troubleshooting Parent Virtual Disk Errors in Fusion", Retrieved on: Aug. 16, 2013, Available at: https://kb.vmware.com-selfservice/microsites/search.do?language=en_US&cmd=displayKC&externalId=1018832.

"Universally Unique Identifier (UUID)", Retrieved on: Nov. 27, 2013, Available at: http://en.wikipedia.org/wiki/Universally_unique_identifier.

"Using Differencing Disks", Retrieved on: Dec. 8, 2010, Available at: https://technet.microsoft.com/en-us/library/cc720381(v=ws.10).aspx.

"Virtual Hard Disk Image Format Specification", Microsoft Corporation, Oct. 11, 2006, 17 Pages.

"VMWare Recovering Vmware Snapshot After Parent Changed", Published on: Feb. 23, 2011, Available at: http://it.it-larsen.dk/index.

(56) References Cited

OTHER PUBLICATIONS php?option=com_content&view=article&id=6:vmware-recovering-vmware-snapshot-after-parent-changed&catid=1:vmware-35&itemid=4.
"What pv Technology Means in vSphere", Published On: Jan. 30, 2010, Available at: http://www.lusovirt.com/wordpressnp= 5.
Agarwal, Sankalp, "Distributed Checkpointing of Virtual Machines in Xen Framework", Thesis Submitted in Partial Fulfillment of the Requirements for the Degree of Master of Technology in Computer Science and Engineering, May 2008, 54 Pages.
Bandulet, Christian, "Object-Based Storage Devices", Published On: Jul. 2007, Available at: http://developers.sun.com/solaris/articles/osd.html.
Campbell, Lisa, "Hyper-V Scalability Evident in Its New Virtual Disk Format", Published on: Jul. 9, 2012, Available at: http://blogs.unitrends.com/hyper-v-scalability-evident-virtual-disk-format/.
Dean, et al., "Data Movement in Kernelized Systems", In Proceedings of the Workshop on Micro-kernels and Other Kernel Architectures, Apr., 1992, 22 Pages.
"Automated, Integrated, and Scalable Protection of Virtual Machines", Published On: Jul. 26, 2010, Available at: http://www.dell.com/downloads/global/products/pvaul/en/equallogic_ps_vmware_asmve_specsheet.pdf.
Devulapalli, et al., "Design of an Intelligent Object-based Storage Device", Retrieved on: Jul. 5, 2010, Available at: http://archive.osc.edu/research/network_file/projects/object/papers/istor-tr.pdf.
Elnozahy, et al., "The Performance of Consistent Checkpointing", In 11th Symposium on Reliable Distributed Systems, Oct. 5, 1992, pp. 39-47.

Eshel, et al., "Panache: A Parallel File System Cache for Global File Access", In Proceedings of the 8th USENIX Conference on File and Storage Technologies, Feb. 2010, 14 Pages.
Jarvinen, et al., "Embedded SFE: Offloading Server and Network Using Hardware Tokens", Financial Cryptography and Data Security, Jan. 2010, 21 Pages.
Kerr, Kenny, "The Virtual Disk API in Windows 7", Published On: Apr. 2009, Available at: https://msdn.microsoft.com/en-us/magazine/dd569754.aspx.
Lachaize, et al., "A Distributed Shared Buffer Space for Data-intensive Applications", In Proceedings of the Fifth IEEE International Symposium on Cluster Computing and the Grid, vol. 2, May 2005, pp. 913-920.
Leser, Norbert, "Towards a Worldwide Distributed File System", The OSF DCE File System as an Example, Sep. 27, 1990, 13 Pages.
"Offloaded Data Transfer (ODX) with Intelligent Storage Arrays", Microsoft Corporation, Feb. 28, 2012, 14 Pages.
Narayanan, et al., "Write Off-Loading: Practical Power Management for Enterprise Storage", In ACM Transactions on Storage (TOS) TOS, vol. 4, Issue 3, Nov. 2008, 15 Pages.
Wang, et al., "Cooperative Cache Management in S2FS", In Proceedings of PDPTA, May 10, 1999, 7 Pages.
Wang, et al., "A Computation Offloading Scheme on Handheld Devices", In Journal of Parallel and Distributed Computing, vol. 64, Issue 6, Jun. 2004, pp. 740-746.
Wu, et al., "Distributed Runtime Load-Balancing for Software Routers on Homogeneous Many-Core Processors'", In Proceedings of the ACM Context Workshop on Programmable Routers for Extensible Services of Tomorrow, Nov. 30, 2011, 6 Pages.
Yang, et al., "Windows Server 2008", Virtual Hard Disk Performance, A Microsoft White Paper, Mar. 2010, 35 Pages.

\* cited by examiner

COPY OFFLOAD FOR DISPARATE OFFLOAD PROVIDERS

BACKGROUND

One mechanism for transferring data is to read the data from a file of a source location into main memory and write the data from the main memory to a destination location. While in some environments, this may work acceptably for relatively little data, as the data increases, the time it takes to read the data and transfer the data to another location increases. In addition, if the data is accessed over a network, the network may impose additional delays in transferring the data from the source location to the destination location. Furthermore, security issues combined with the complexity of storage arrangements may complicate data transfer.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to offload technology. In aspects, a source offload provider may transfer bulk data to a destination offload provider even if the offload providers are different and independent from each other and have no prior knowledge of each other. In preparation for transferring bulk data, trust may be extended to the offload providers. After authentication, the offload providers may transfer all or a portion of the bulk data over a secure channel without the data traversing the initiator of the transfer.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. For example, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
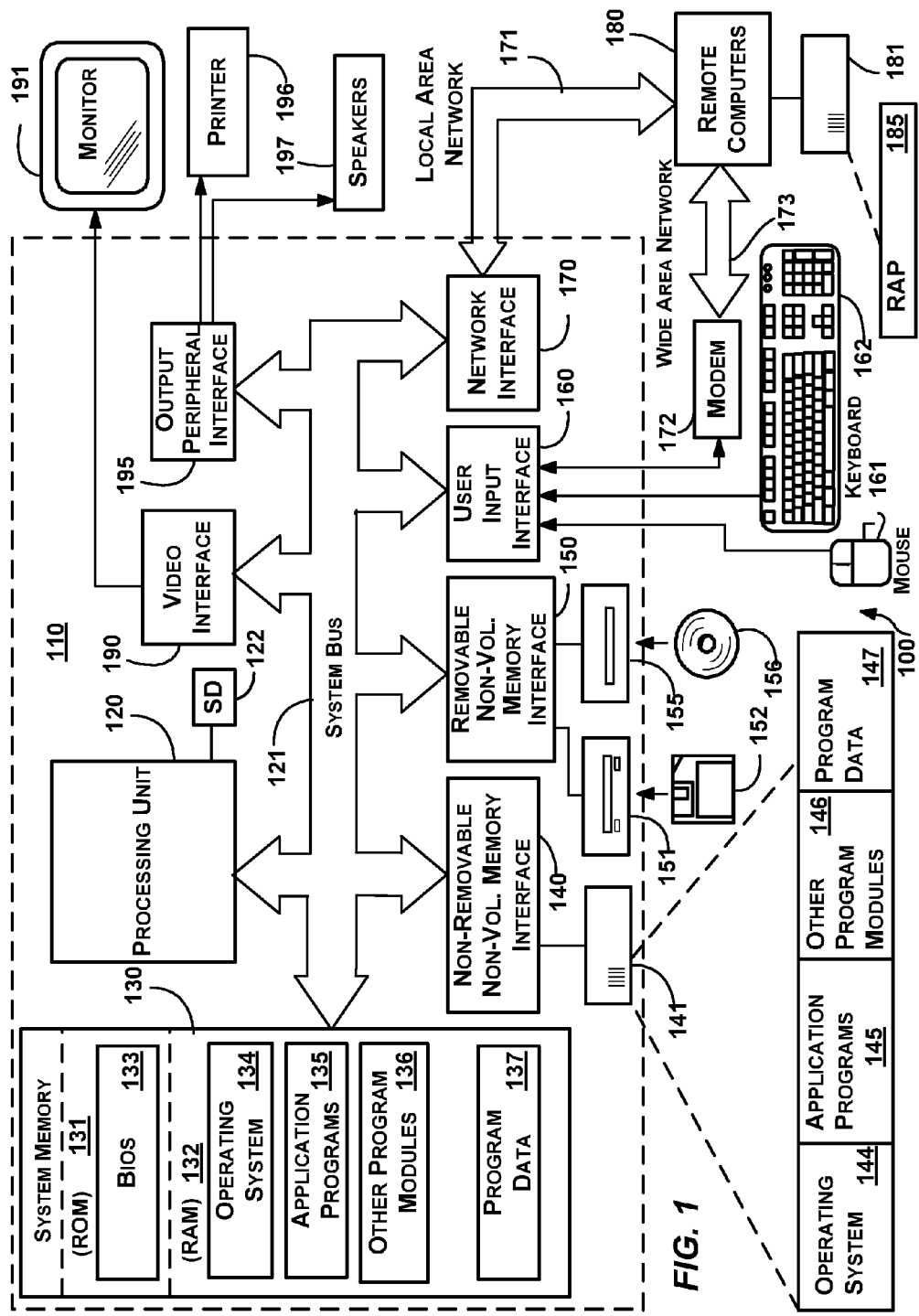
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Offload Reads and Writes

As mentioned previously, some traditional data transfer operations may not be efficient or even work in today's storage environments.

FIGS. 2-5 are block diagrams that represent exemplary arrangements of components of systems in which aspects of the subject matter described herein may operate. The components illustrated in FIGS. 2-5 are exemplary and are not meant to be all-inclusive of components that may be needed or included. In other embodiments, the components and/or functions described in conjunction with FIGS. 2-5 may be included in other components (shown or not shown) or placed in subcomponents without departing from the spirit or scope of aspects of the subject matter described herein. In some embodiments, the components and/or functions described in conjunction with FIGS. 2-5 may be distributed across multiple devices.

Figure 2:
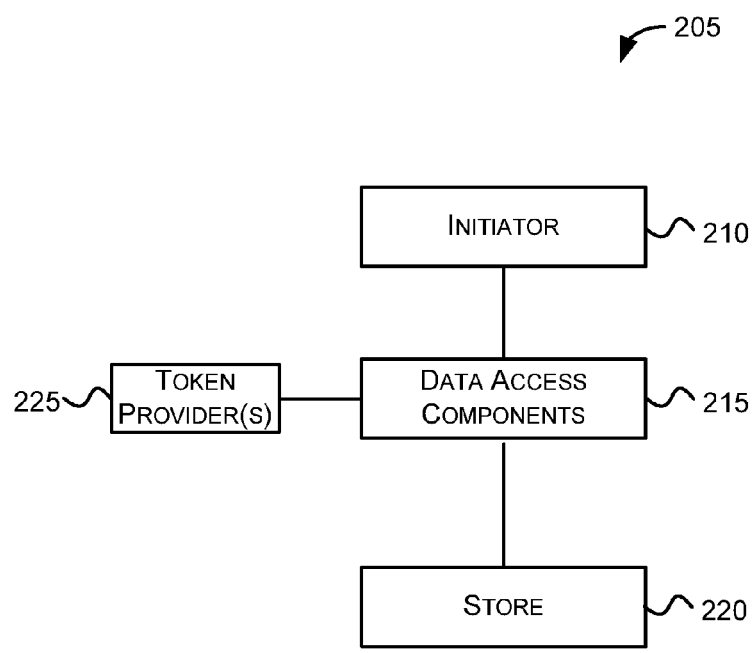
FIGS. 2-4 are block diagrams that represent exemplary arrangements of components of systems in which aspects of the subject matter described herein may operate.

Turning to FIG. 2, the system 205 may include a initiator 210, data access components 215, token provider(s) 225, a store 220, and other components (not shown). The system 205 may be implemented via one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

Where the system 205 comprises a single device, an exemplary device that may be configured to act as the system 205 comprises the computer 110 of FIG. 1. Where the system 205 comprises multiple devices, one or more of the multiple devices may comprise the computer 110 of FIG. 1 where the multiple devices may be configured similarly or differently.

The data access components 215 may be used to transmit data to and from the store 220. The data access components 215 may include, for example, one or more of: I/O managers, filters, drivers, file server components, components on a storage area network (SAN) or other storage device, and other components (not shown). As used herein, a SAN may be implemented, for example, as a device that exposes logical storage targets, as a communication network that includes such devices, or the like.

In one embodiment, a data access component may comprise any component that is given an opportunity to examine I/O between the initiator 210 and the store 220 and that is capable of changing, completing, or failing the I/O or performing other or no actions based thereon. For example, where the system 205 resides on a single device, the data access components 215 may include any object in an I/O stack between the initiator 210 and the store 220. Where the system 205 is implemented by multiple devices, the data access components 215 may include components on a device that hosts the initiator 210, components on a device that provides access to the store 220, and/or components on other devices and the like. In another embodiment, the data access components 215 may include any components (e.g., such as a service, database, or the like) used by a component through which the I/O passes even if the data does not flow through the used components.

As used herein, the term component is to be read to include hardware such as all or a portion of a device, a collection of one or more software modules or portions thereof, some combination of one or more software modules or portions thereof and one or more devices or portions thereof, and the like. A component may include or be represented by code.

As used herein, the term computer code is to be read to include instructions that dictate actions a computer is to take. These instructions may be included in any computer-readable media, volatile or nonvolatile.

In one embodiment, the store 220 is any storage media capable of storing data. The store 220 may include volatile memory (e.g., a cache) and nonvolatile memory (e.g., a persistent storage). The term data is to be read broadly to include anything that may be represented by one or more computer storage elements. Logically, data may be represented as a series of 1's and 0's in volatile or nonvolatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, commands, other data, or the like.

The store 220 may comprise hard disk storage, solid state, or other nonvolatile storage, volatile memory such as RAM, other storage, some combination of the above, and the like and may be distributed across multiple devices (e.g., multiple SANs, multiple file servers, a combination of heterogeneous devices, and the like). The devices used to implement the store 220 may be located physically together (e.g., on a single device, at a datacenter, or the like) or distributed geographically. The store 220 may be arranged in a tiered storage arrangement or a non-tiered storage arrangement. The store 220 may be external, internal, or include components that are both internal and external to one or more devices that implement the system 205. The store 220 may be formatted (e.g., with a file system) or non-formatted (e.g., raw).

In another embodiment, the store 220 may be implemented as a storage container rather than as direct physical storage. A storage container may include, for example, a file, volume, disk, virtual disk, logical unit, logical disk, writable clone, volume snapshot, logical disk snapshot, physical disk, solid state storage (SSD), hard disk, data stream, alternate data stream, metadata stream, or the like. For example, the store 220 may be implemented by a server having multiple physical storage devices. In this example, the server may present an interface that allows a data access component to access data of a store that is implemented using one or more of the physical storage devices or portions thereof of the server.

The level of abstraction may be repeated to any arbitrary depth. For example, the server providing a storage container to the data access components 215 may also rely on a storage container to access data.

In another embodiment, the store 220 may include a component that provides a view into data that may be persisted in nonvolatile storage or not persisted in nonvolatile storage.

Figure 3:
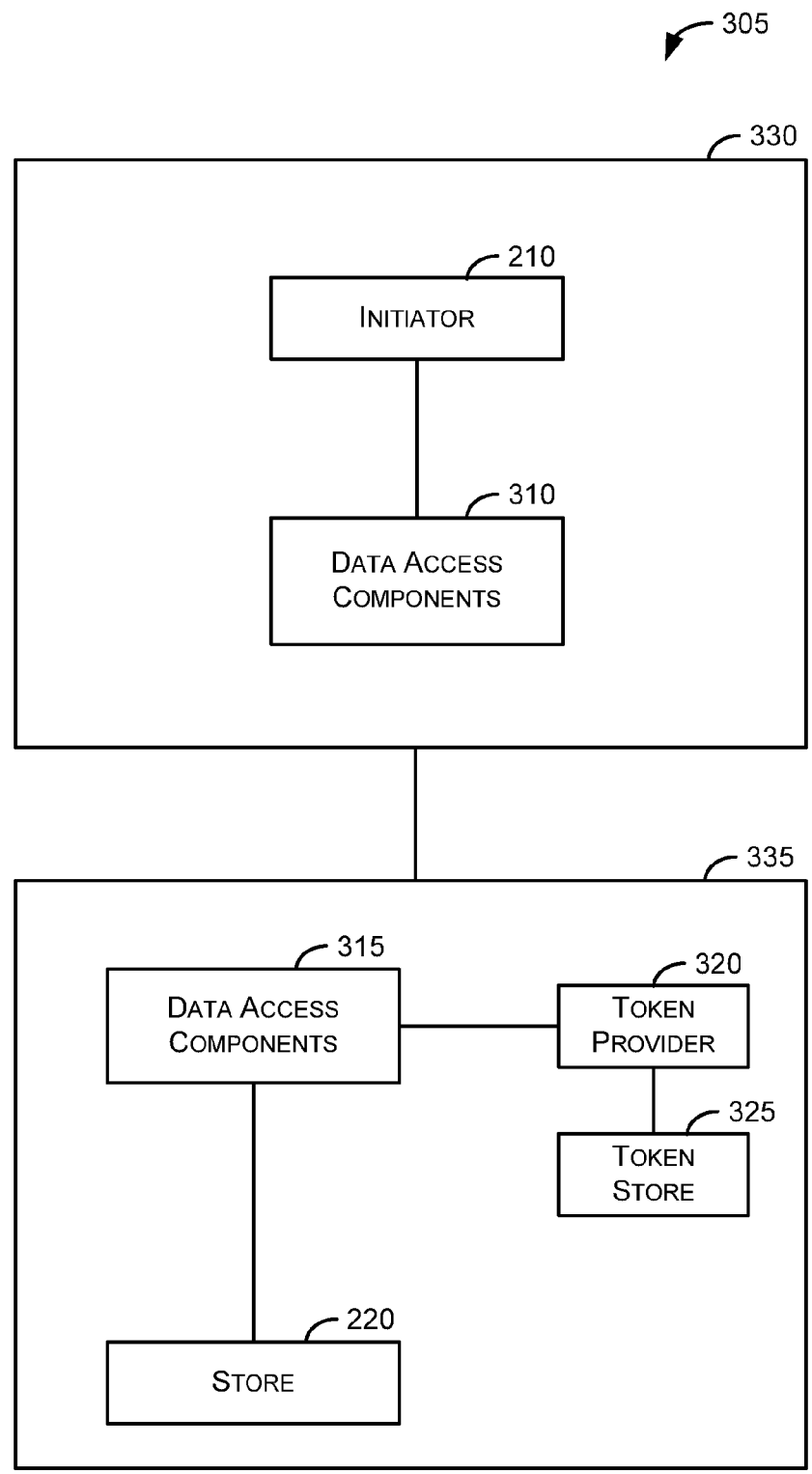

One or more of the data access components 215 may reside on an apparatus that hosts the initiator 210 while one or more other of the data access components 215 may reside on an apparatus that hosts or provides access to the store 220. For example, if the initiator 210 is an application that executes on a personal computer, one or more of the data access components 215 may reside in an operating system hosted on the personal computer. An example of this is illustrated in FIG. 3.

As another example, if the store 220 is implemented by a storage area network (SAN), one or more of the data access components 215 may implement a storage operating system that manages and/or provides access to the store 220. When the initiator 210 and the store 220 are hosted in a single apparatus, all or many of the data access components 215 may also reside on the apparatus.

An offload read allows an initiator to obtain a token that represents data of a store. Using this token, the initiator or another initiator may request an offload write. An offload write allows a initiator to cause an offload provider to write some or all of the data represented by the token.

In one embodiment, a token is an unpredictable number that is obtained via a successful offload read. A token represents data that is immutable as long as the token is valid. The data a token represents is sometimes referred to as bulk data.

An offload provider is an entity (possibly including multiple components spread across multiple devices) that provides indirect access to data associated with a token. Logically, an offload provider is capable of performing an offload read and/or offload write. Physically, an offload provider may be implemented by one or more of the data access components 215 and a token provider.

In servicing an offload read or offload write, an offload provider may logically perform operations on the data of the store and/or on tokens associated with a token provider. For example, for an offload read, an offload provider may logically copy data from a logical storage container backed by data of a store into a token (which may also be backed by data of the store), while for an offload write, the offload provider may logically copy data from a token to a logical storage container backed by data of the store.

An offload provider may transfer data from a source store, write data to a destination store, and maintain data to be provided upon receipt of a token associated with the data. In some implementations, an offload provider may indicate that an offload write command is completed after the data has been logically written to the destination store. In addition, an offload provider may indicate that an offload write command is completed but defer physically writing data associated with the offload write until convenient.

In some implementations, an offload provider may share data between a first logical storage container and a second logical storage container, and may share data between a token and a storage container. The offload provider may stop sharing data as part of performing a write to physical storage locations of the store which would otherwise cause more than one storage container to be modified, or would otherwise cause the data represented by a token to change.

In some implementations, an offload provider may perform a logical copy from a storage container to a token or a logical copy from a token to a storage container by initiating sharing of data between a token and a storage container. For example, the offload provider may perform an offload read by logically copying the data from the source storage container to the token by initiating sharing of data between the source storage container and the token. In another example, the offload provider may perform an offload write by logically copying the data from the token to the destination storage container by initiating sharing of data between the token and the destination storage container.

In some implementations, an offload provider may invalidate a token to, for example, avoid sharing data and/or avoid physically copying data. For example, the offload provider may perform an offload write by logically copying data from the token to the destination storage container by updating the data structures of the destination storage container to refer to the physical storage locations of the store referenced by the token, and in conjunction therewith, logically invalidate at least a portion of the token. Note that this may still result in the source and destination storage containers sharing data.

In some implementations, an offload provider may initiate sharing of data storage locations among all tokens and storage containers already sharing the data, and in addition, another storage container or token. For example, to service an offload read, an offload provider may initiate sharing between a source storage container and a token. Then, to service an offload write using the token, the offload provider may initiate sharing among the source storage container, the token, and the destination storage container. If the token is later invalidated, sharing with the token is stopped, but the sharing between source and destination storage containers may continue (e.g., until a write is received that is directed at that data).

As used herein, in one implementation, a token provider is part of an offload provider. In this implementation, where a token provider is described as performing actions, it is to be understood that the offload provider that includes the token provider is performing those actions. In another implementation, a token provider may be separate from the offload provider.

To initiate an offload read of data of the store 220, the initiator 210 may send a request to obtain a token representing the data using a predefined command (e.g., via an API). In response, one or more of the data access components 215 may respond to the initiator 210 by providing one or more tokens that represents the data or a subset thereof. A token may be represented by a sequence of bytes which are used to represent immutable data. The size of the immutable data may be larger, smaller, or the same size as the token.

With a token, the initiator 210 may request that all or portions of the data represented by the token be logically written. Sometimes herein this operation is called an offload write. The initiator 210 may do this by sending the token together with one or more offsets and lengths to the data access components 215.

The data access components 215 may be implemented as a storage stack where each layer of the stack may perform a different function. For example, the data access components may partition data, split offload read or write requests, cache data, verify data, snapshot data, and the like.

One or more layers of the stack may be associated with a token provider. A token provider may include one or more components that may generate or obtain tokens that represent portions of the data of the store 220 and provide these tokens to an initiator.

For a portion of an offload write, for a token involved, a token-relative offset may be indicated as well as a destination-relative offset. Either or both offsets may be implicit or explicit. A token-relative offset may represent a number of bytes (or other units) from the beginning of data represented by the token, for example. A destination-relative offset may represent the number of bytes (or other units) from the beginning of data on the destination. A length may indicate a number of bytes (or other units) starting at the offset.

If a data access component 215 fails an offload read or write, an error code may be returned that allows another data access component or the initiator to attempt another mechanism for reading or writing the data.

FIG. 3 is a block diagram that generally represents an exemplary arrangement of components of systems in which a token provider is hosted by the device that hosts the store. As illustrated, the system 305 includes the initiator 210 and the store 220 of FIG. 2. The data access components 215 of FIG. 3 are divided between the data access components 310 that reside on the device 330 that hosts the initiator 210 and the data access components 315 that reside on the device 335 that hosts the store 220. In another embodiment, where the store 220 is external to the device 335, there may be additional data access components that provide access to the store 220.

The device 335 may be considered to be one example of an offload provider as this device includes components for performing offload reads and writes and managing tokens.

The token provider 320 may generate, validate, and invalidate tokens. For example, when the initiator 210 asks for a token for data on the store 220, the token provider 320 may generate a token that represents the data. This token may then be sent back to the initiator 210 via the data access components 310 and 315.

In conjunction with generating a token, the token provider 320 may create an entry in the token store 325. This entry may associate the token with data that indicates where on the store 220 the data represented by the token may be found. The entry may also include other data used in managing the token such as when to invalidate the token, a time to live for the token, other data, and the like.

When the initiator 210 or any other entity provides the token to the token provider 320, the token provider 320 may perform a lookup in the token store 325 to determine whether the token exists. If the token exists and is valid, the token provider 320 may provide location information to the data access components 315 so that these components may logically read or write or logically perform other operations with the data as requested.

In another exemplary arrangement similar to FIG. 3, the token provider 320 and token store 325 may be included in the device 330, and the data access components 310 connected to token provider 320. For example, an operating system (OS) of the device 330 may include the token provider 320 and the token store 325. In this example, the initiator 210 may assume the existence of a token provider and token store for all copying performed by the initiator 210. With this assumption, the initiator 210 may be implemented to omit code that falls back to normal read and write.

In the example above, the OS may implement offload read by reading the requested data from the data access components 315 and storing the data in storage (volatile or non-volatile) of device 330, creating a new token value, and associating the newly created token value with the read data. The OS may implement offload write by copying (e.g., writing) the data associated with the token to the destination specified by initiator 210. In this example, the initiator 210 may need to re-attempt a copy at the offload read step in some scenarios, but this re-attempt may be less burdensome for the initiator than falling back to normal read and write.

Figure 4:
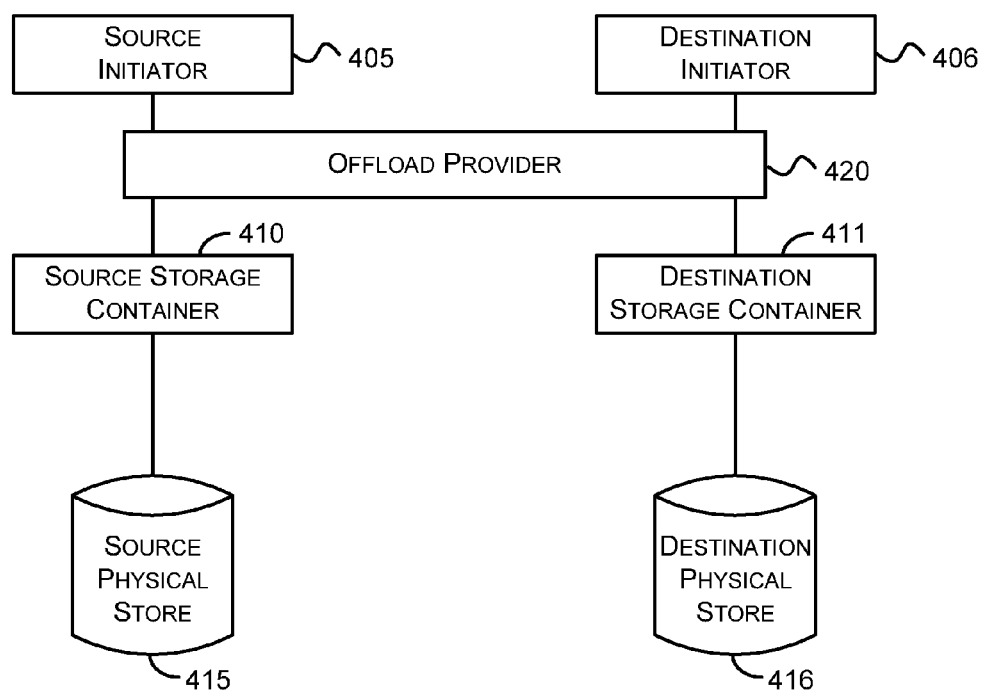

FIG. 4. is a block diagram that generally represents another exemplary environment in which aspects of the subject matter described herein may be implemented. As illustrated, the environment includes a source initiator 405, a destination initiator 406, a source storage container 410, a destination storage container 411, a source physical store 415, a destination physical store 416, an offload provider 420, and may include other components (not shown).

The source initiator 405 and the destination initiator may be implemented similarly to the initiator 210 of FIG. 2. The source initiator 405 and the destination initiator 406 may be two separate entities or a single entity.

If the source storage container 410 and the destination storage container 411 are implemented by a single system, the offload provider 420 may be implemented as one or more components of the system implementing the storage containers. If the source storage container 410 and the destination storage container 411 are implemented by different systems, the offload provider 420 may be implemented as one or more components that are distributed across the systems implementing the storage containers.

Furthermore, there may be more than two instances of storage containers and physical stores. For example, for a given token obtained from a source, there may be more than one destination specified. For example, multiple offload writes may be issued which refer to a single token, and each offload write may successfully target any destination known to the offload provider 420.

The source physical store 415 and the destination physical store 416 may be the same store or different stores. These physical stores store physical data that backs the source and destination storage containers, and may also back the data represented by the tokens.

Although illustrated as only having one storage container between the initiator and the physical store, as mentioned previously, in other embodiments there may be multiple layers of storage containers between the initiator and the physical store.

The source initiator 405 may obtain a token by issuing an offload read. In response, the offload provider 420 may generate a token and provide it to the source initiator 405.

If the source initiator 405 and the destination initiator 406 are separate entities, the source initiator 405 may provide the token to the destination initiator 406. The destination initiator 406 may then use the token to issue an offload write to the destination storage container 411.

In receiving the offload write request, the offload provider 420 may validate the token and logically write data to the destination storage container 411 as indicated by the offload write request.

Disparate Offload Providers

Figure 5:
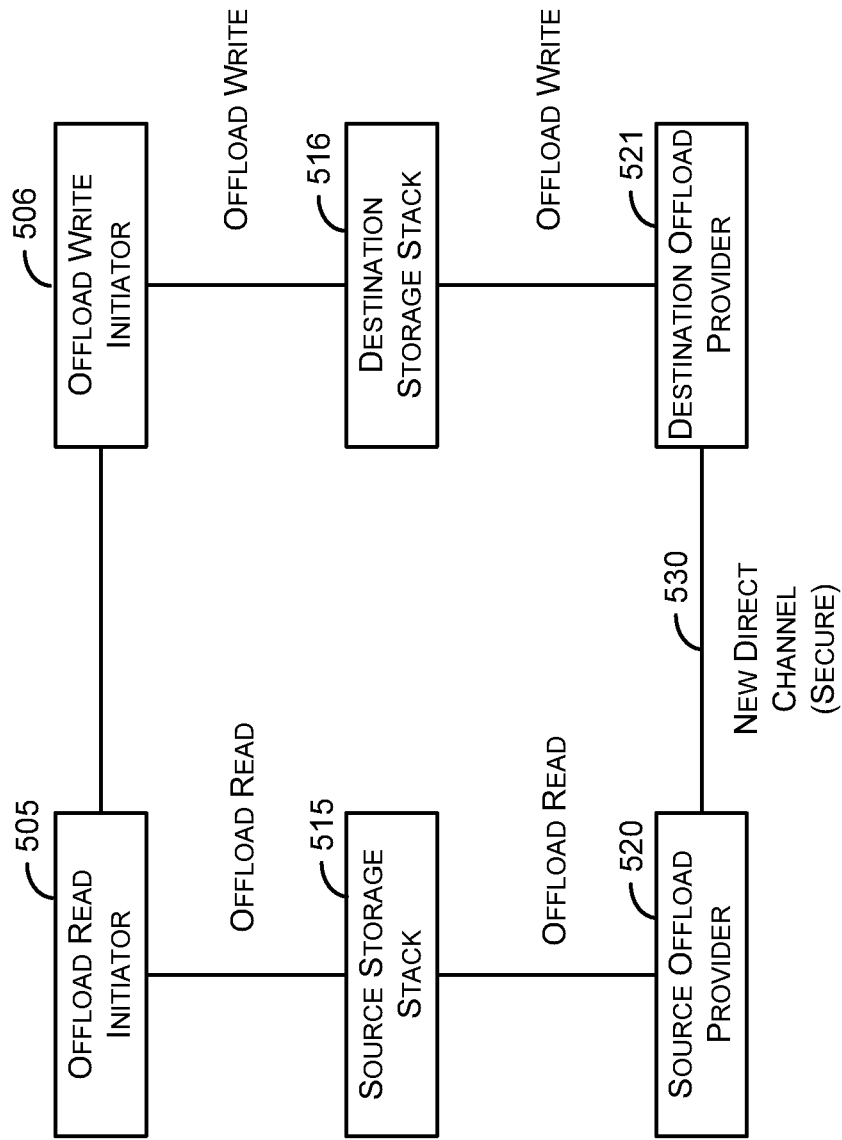
FIG. 5 is a block diagram illustrating disparate offload providers in accordance with aspects of the subject matter described herein.

FIG. 5 is a block diagram illustrating disparate offload providers in accordance with aspects of the subject matter described herein. In some cases, it may be desirable to obtain a token using an offload read directed to one offload provider and then use that token to perform an offload write on a different offload provider. Prior to the offload write request, the two offload providers may or may not have any knowledge about each other.

In accordance with aspects of the subject matter described herein, the source offload provider 520 (hereinafter sometimes referred to as "the source 520") and the destination offload provider 521 (hereinafter sometimes referred to as "the destination 521") may be any two offload providers with a compatible offload provider protocol and a communications path between them (e.g. valid network route via the Internet). No pre-existing trust relationship between the source 520 and the destination 521 is required. The initiator of the offload read (e.g., the offload read initiator 505) and the initiator of the offload write (e.g., the offload write initiator 506) may or may not be the same entity.

The offload read initiator 505 (hereinafter sometimes referred to as "the initiator") trusts the source offload provider 520 for purposes of being the source of the requested data. The offload write initiator 506 trusts the destination for purposes of writing bulk data represented by the token to a requested destination storage container. The offload read initiator 505 trusts the offload write initiator 506 for purposes of having access to the bulk data and not divulging the bulk data to any inappropriate parties. The offload write initiator 506 trusts the offload read initiator 505 for purposes of reading data.

These trust relationships may be used/extended to the source 520 and the destination 521. The initiators may prove to the source 520 that the destination 521 is a correct destination for a particular transfer (among potentially more than one correct destination). In one implementation, trust relationships may be extended by sending trust data. Trust data may include a secret or perhaps non-secret data. In other implementations, trust relationships may be extended via other cryptographic means such as public/private key cryptography or other cryptographic means.

The communication between the source 520 and destination 521 may be encrypted using a key provided by the initiators. This key may be unique to a particular transfer. The source 520 validates that communication from the destination 521 is from a valid (e.g., trusted by the initiators) destination offload provider. The destination 521 validates that the communication is really from the source 520.

The network address of the source 520 may be conveyed to the destination 521 in a variety of ways including, for example, being embedded in the token, as auxiliary data conveyed with or in conjunction with the token, or the like. The network address may be any type of address relevant to any digital communications technology, such as an IPV4 Internet address and port, IPV6 address, Ethernet address, or the like. The network address may require translation or conversion on first use. For example, the address may be an identifier that maps to a current IP address via a distributed hash table. Depending on the type of address and the reachability of the address, the address may be relevant and usable at any size geographical scope (from small to worldwide). In one implementation, the network address of the destination 521 may be transmitted to the source 520 which may initiate the establishment of the communication channel between the source 520 and the destination 521.

One exemplary mechanism for extending/using the trust previously mentioned is described below. There is no intention, however, of limiting aspects of the subject matter only to the example described below. Indeed, based on the teachings herein, those skilled in the art may recognize other mechanisms that may be used without departing from the spirit or scope of aspects of the subject matter described herein.

The word "transfer" as used below is used to refer to an overall offload read+offload write sequence wherein some bulk data is transferred from a source to a destination without the bulk data needing to transit the initiator(s) of the offload read and offload write.

In one implementation, the token is not used as the only shared secret. A copy offload may have potentially multiple destinations that know the token value. In this implementation, just knowing the token value may not allow an alleged source offload provider to prove to the destination offload provider that the alleged source offload provider is really the source offload provider, rather than a different non-cooperating destination offload provider.

Below are some exemplary steps of transferring data from the source 520 to the destination 521:

1. In one example, the offload read initiator 505 sends a transfer-specific key ("Ksecret") to the source 520 along with the offload read request. In another example, the source 520 generates and provides a key separate from the token value in the offload read response.

This establishes a shared secret ("Ksecret") between the source 520 and the offload read initiator 505, with the shared secret as safe as the bulk data would have been (e.g., conveyed via the same communication channel as the bulk data would have been, if using normal read/write instead of offload). In some implementations, the Ksecret value may be the same for more than one transfer, potentially across use of more than one token.

2. The offload read initiator 505 may forward the token to the offload write initiator 506 (or they may be the same initiator). If the offload read initiator 505 and the offload write initiator 506 are separate initiators, the offload write initiator 506 may be treated as part of the destination storage stack. With this in mind, below, the offload read initiator and the offload write initiator are described as both being initiated by the offload read initiator 505 (hereinafter sometimes referred to simply as "the initiator").

In an implementation, round-trip communications may be minimized to remove any communications that are not necessary. An offload write is an offload write regardless of form. For example, forwarding a token to a different machine that in turn issues an offload write is really just a different way for an offload read initiator to initiate an offload write.

3. When performing an offload write, the initiator 505 sends the token (as usual) and, in addition may also send <salt, Ksecret(salt)>. Note that Ksecret(salt) is a numeric value (the salt) encrypted with the secret key (Ksecret) which is known only to the source 520 and initiator. The destination 521 does not know Ksecret itself, but the destination 521 does know that Ksecret is only known by the initiator and source 520. The destination 521 implicitly trusts the initiator to behave correctly with respect to this transfer, since the initiator could just as well write anything the initiator wants to write.

The destination 521 sends Ksecret(salt) to the source 520 (but does not send the salt value to the source), and the source 520 can then decrypt Ksecret(salt) to obtain the salt value, and respond (e.g., via data encrypted by the key shared between the source and destination) to the destination 521 with the salt value. The destination 521 then knows that the source 520 knows Ksecret, and therefore that the source is really the source (the initiator is already implicitly trusted with respect to the requested write, up front—but now the initiator has convinced the destination 521 to trust the source 520 with respect to the requested write), without the destination 521 ever knowing Ksecret.

In another implementation, the source 520 may send Kchannel(timestamp) or Kchannel(<salt provided by destination 521>) to prove that the source 520 was able to decrypt Ksecret(<Kchannel, "valid">), proving to the destination 521 that the source 520 knows Ksecret and is therefore known to be the actual source 520.

4. The channel 530 used for communication between the source 520 and destination 521 is a new channel. In terms of security, in one implementation, the channel 530 is at least as secure as the channels between the initiator and the source 520, and between the initiator and the destination 521. The "at least as secure as" part may change as computation capacity and decryption capabilities evolve. In one implementation, the channel may be encrypted with a fairly long key suitable for highly sensitive data. For today's technology a 256 bit AES key may be sufficient. The length and type of this key may change with technology. Each of the source 520, the destination 516 and initiator may refuse to participate in a transfer if the key length is not long enough (e.g., as specified by their respective configurations).

The key used to encrypt the channel between source and destination may be generated by the source 520, the initiator, or the destination 521. The key used to secure the channel is sometimes referred to herein as "Kchannel" to distinguish it from "Ksecret". In one implementation, Kchannel is generated at the source 520 and the source 520 sends Kchannel to the initiator in the offload read response.

In another implementation, Kchannel is generated at the initiator. In this implementation, sending the key from source 520 to the initiator is not needed. In addition, the initiator may generate a key per source, destination pair (and per transfer).

5. The initiator sends <Kchannel, Ksecret(<Kchannel, "valid">)> to the destination 521.

6. The destination 521 extracts the network address of the source 520 from the token, or from information conveyed along with the token (e.g., from the source 520 to the initiator to the destination 521).

7. The destination 521 sends Ksecret(<Kchannel, "valid">) to the source 520.

8. The source 520 decrypts using Ksecret to get <Kchannel, "valid">. The "valid" portion matching the expected value at the source 520 proves to the source 520 that the destination 521 that sent the message is really a valid destination.

9. The source 520 may send Kchannel(timestamp) or Kchannel(<salt provided by destination 521>) to prove that the source 520 was able to decrypt Ksecret(<Kchannel, "valid">), proving to the destination 521 that the source 520 knows Ksecret and is therefore known to be the actual source.

10. From this point onward, the source 520 and destination 521 may communicate using encrypted messages which are encrypted with Kchannel. Each message may include a validity check value and sequence number which will only match the expected value if the message has not been tampered with. No other entity may know Kchannel other than those entities which would have had access to the bulk data anyway had normal read/write been used instead of offload operations.

For added security, any layer of the destination storage stack that needs to process an offload write by sending two or more offload writes to two or more destinations may avoid using the same Kchannel key with two different destinations, especially when there is any possibility that the two or more destinations might not be within precisely the same trust boundaries. This may be done, for example, to prevent one destination from snooping on the channel between the source 520 and a different destination to determine that the different destination received some data from the same token. Instead, such a layer may avoid this by limiting its handling of the offload write to a single destination per Kchannel key.

Note that trust relationships in the destination stack are such that all "higher" layers of the destination stack may have the Kchannel key used in a lower layer. Two separate forks of a lower layer may also have the same key as each other or may have different keys for added security.

Where truncation occurs during an offload operation, the truncation may just be propagated back to the initiator of the offload read, which may then generate a new Kchannel key and issue a new offload write using the same token.

If partial processing is too onerous, the initiator may provide more than one Kchannel key in the initial offload write (along with Ksecret(Kchannel, "valid") for each one), and a stack layer may avoid using the same Kchannel key down two forks to lower layers.

If the initiator supports more than one token per transfer, a separate Kchannel key per destination may suffice (instead of a separate Kchannel per token).

In one implementation, the channel between source 520 and destination 521 may be used to move bulk data for more than one token, as long as all the tokens are for the same transfer and same source.

11. The destination 521 sends the token(s), encrypted using Kchannel, to the source 520, along with an indication of which portions of the token(s)' bulk data are being requested. The destination 521 may refrain from telling the source 520 where the data will be written. Sending the token to the source encrypted in this way does not divulge Kchannel to any entity that does not already know it, and does not divulge the token to the recipient of the message unless the recipient of the message has Kchannel.

12. The source 520 sends the requested bulk data to the destination, encrypted using Kchannel.

13. The destination 521 writes at least some of the bulk data to the offsets of the destination 521 requested in the offload write command.

14. The destination 521 completes the offload write command, which informs the initiator that the transfer is done.

The messages involved between initiator, source 520, and destination 521 may be combined such that only one offload read request/response is needed from the initiator to the source 520, only one offload write is needed between initiator and destination 521, and only one exchange from destination 521 to the source 520 and back is needed. This may be done, for example, to reduce the total latency (e.g., one round-trip from the initiator to the source 520, one round trip from the initiator to the destination 516, and one round trip from the destination 521 to the source 520).

Data transmitted through the encrypted channel may be compressed.

Multiple transfers may occur concurrently, especially when a large amount of bulk data needs to be copied. Concurrent transfers may be done in such a way as to keep the network link from the source 520 to the destination 521 busy transferring bulk data.

Figure 6:
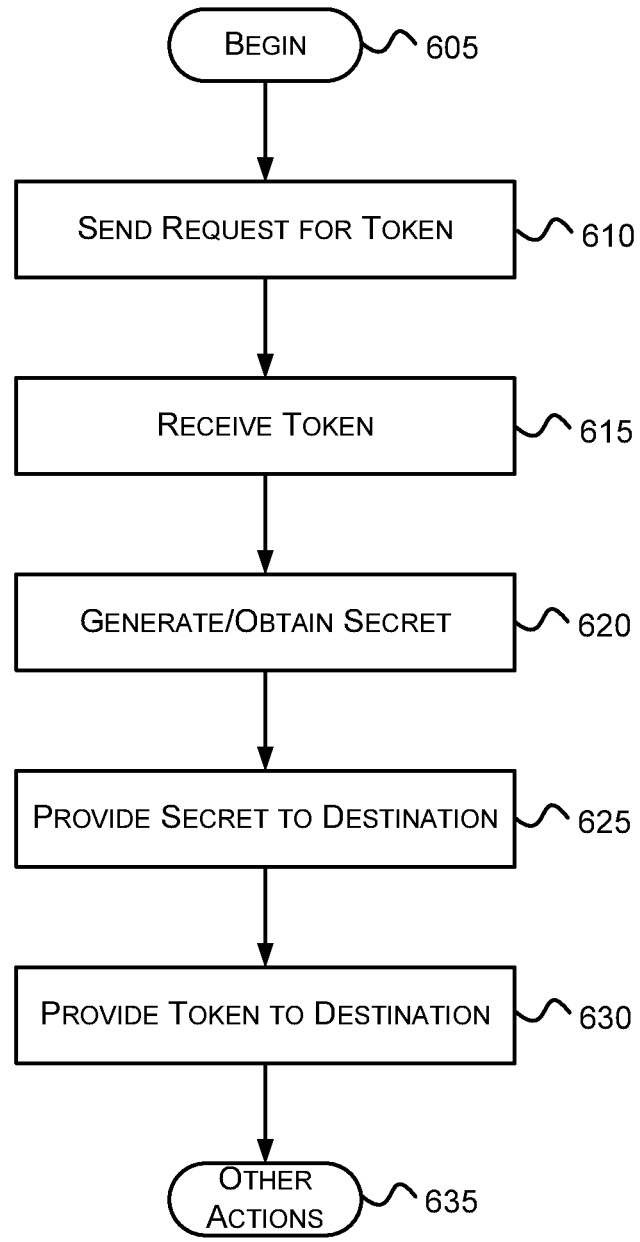
FIG. 6 is a flow diagram that generally represents exemplary actions that may occur at an initiator in accordance with aspects of the subject matter described herein.
Figure 7:
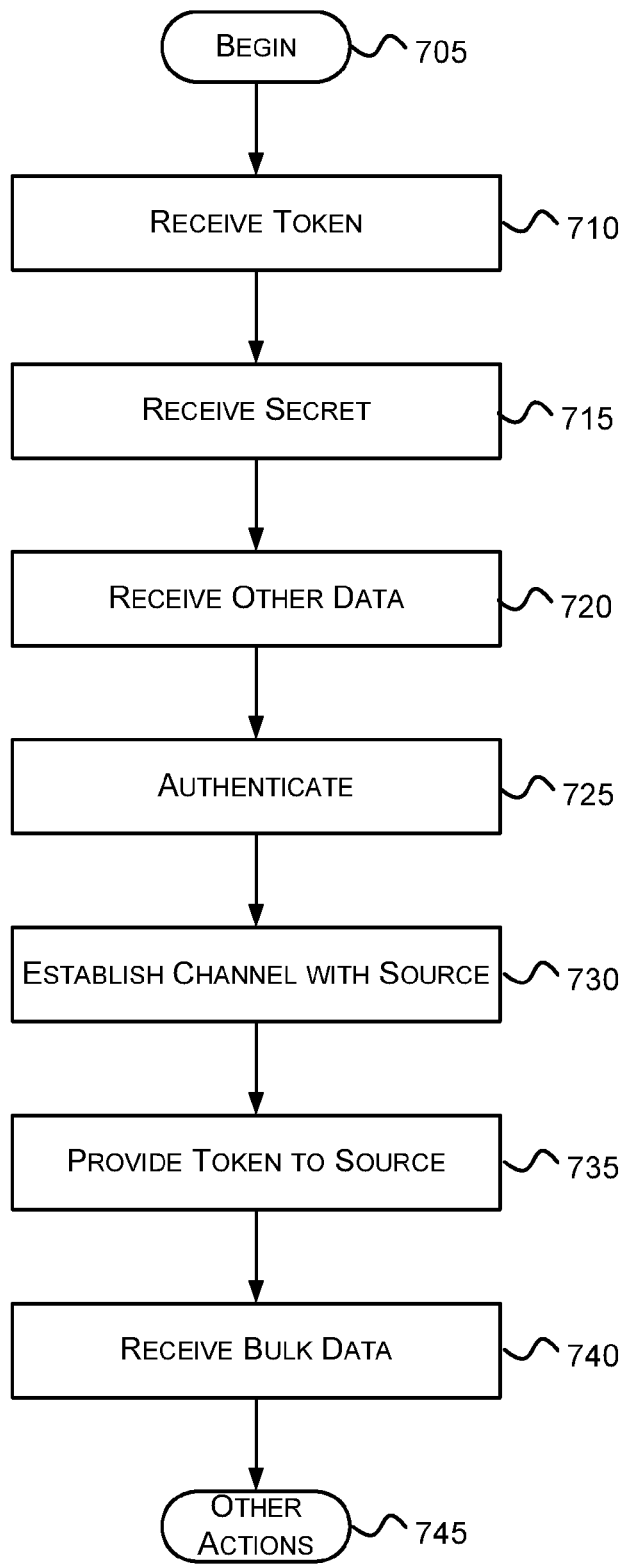
FIG. 7 is a flow diagram that generally represents exemplary actions that may occur on a destination in accordance with aspects of the subject matter described herein.
Figure 8:
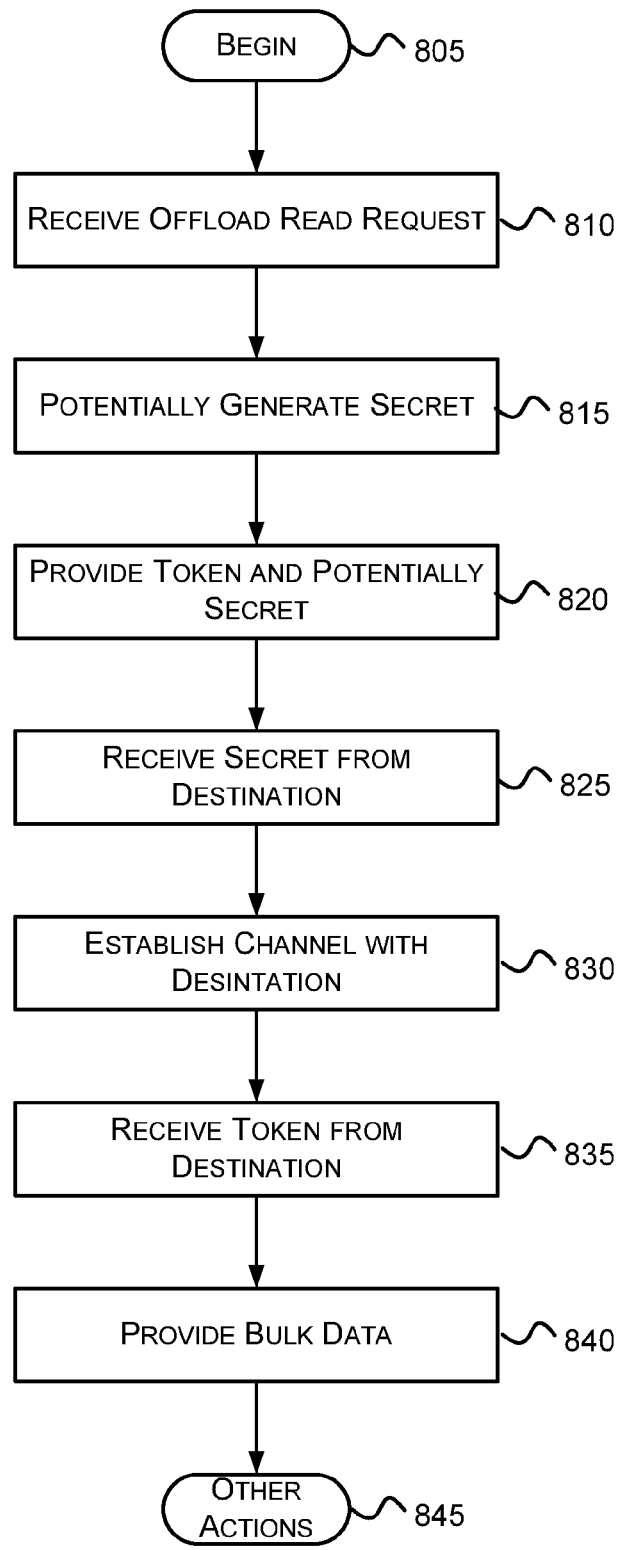
FIG. 8 is a flow diagram that generally represents exemplary actions that may occur on a source in accordance with aspects of the subject matter described herein.

FIGS. 6-8 are flow diagrams that generally represent exemplary actions that may occur in accordance with aspects of the subject matter described herein. For simplicity of explanation, the methodology described in conjunction with FIGS. 6-8 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 6 is a flow diagram that generally represents exemplary actions that may occur at an initiator in accordance with aspects of the subject matter described herein. At 605, the actions begin.

At 610, a request for an offload read token is sent. For example, referring to FIG. 5, the initiator 505 sends an offload read request to the source storage stack 515. The source storage stack 515 delivers the offload read request to the source 520.

At 615, in response to the request, a token is received from the source offload provider. For example, referring to FIG. 5, the source 520 sends a token to the initiator 505. The token may be conveyed in the same message with or separately from other data such as a secret to extend trust and a channel secret as mentioned previously.

At 620, a secret is generated/obtained. If generated at the initiator, the secret may be generated prior to the actions indicated by 610 and sent in the request for the token. In an alternative, the secret may also be generated after the request for the token is sent and may be sent after the request is sent.

As another alternative, instead of generating the secret by the initiator, the secret may be obtained from the source offload provider. In this alternative, the secret may be obtained from the offload read response that conveys the token or in a separate message.

The actions of 625 and 630 may be combined or separate. In one implementation, the secret may be provided together with the token in a single offload write command. In another implementation, the secret may be provided in a separate message from the offload write command in which the token is sent.

At 625, the secret is provided to the destination offload provider. For example, referring to FIG. 4, the offload read initiator 505 provides the secret to the offload write initiator 506 which provides the secret to the destination offload provider 521 via the destination storage stack 516. The secret allows the extension of trust as previously indicated. In particular, the secret allows the source offload provider to trust the destination offload provider as the source offload provider trusts the initiator and for the destination offload provider to trust the source offload provider as the destination offload provider trusts the initiator.

In one implementation, the secret may be provided together with the token in a single offload write command. In another implementation, the secret may be provided in a separate message from the offload write command in which the token is sent.

At 630, the token is provided to the destination offload provider in an offload write command. For example, referring to FIG. 4, the offload read initiator 505 may provide the token to the offload write initiator 506 (if they are separate entities) which provides the token to the destination offload provider 521 via the destination storage stack 516. The offload write command indicates an instruction to copy at least a portion of the immutable data from the source offload provider to the destination offload provider.

The source offload provider and the destination offload provider may be the same offload provider or they may be independent of each other. Independent means that they are different offload providers and are not the same offload provider. In one implementation, independent offload providers may be backed by one or more of the same storage devices and/or may share one or more components. In another implementation, independent offload providers are not backed by any common storage and do not share any components.

An example where the source and destination offload providers are the same offload provider (and hence not independent) is illustrated in FIG. 4 with offload provider 420.

At block 635, other actions, if any, may be performed. Other actions may include, for example, providing a Kchannel key with which to secure a communications channel between the source offload provider and the destination offload provider. This Kchannel key may be generated by the initiator, the source, or the destination. There may be an additional Kchannel key for each additional destination offload provider to which data represented by the token is to be copied.

Other actions may also include, for example, providing a network address of the source offload provider to the destination offload provider by embedding the network address in the token.

Other actions may also include, for example, providing a network address of the source offload provider to the destination offload provider by embedding in the token a lookup key usable to find the network address.

Other actions may also include, for example, any other actions indicated herein as pertaining to the initiator.

FIG. 7 is a flow diagram that generally represents exemplary actions that may occur on a destination in accordance with aspects of the subject matter described herein. At 705, the actions begin.

At 710, a token is received from the initiator. For example, referring to FIG. 5, the destination 521 receives a token from the offload read initiator 505. The token is generated by a source offload provider that ensures immutability of the data as long as the token is valid.

At 715, a secret is received from the initiator. For example, referring to FIG. 5, the destination 521 receives a secret from the offload read initiator 505. The secret allows the extension of trust as previously mentioned.

The token and secret may be received in a single message or in multiple messages from the initiator.

At 720, other data is received at the destination. This other data may include, for example, a Kchannel key with which to secure a communications channel between the destination offload provider and the source offload provider, a network address, or other data that has been mentioned herein.

At 725, authentication occurs. For example, referring to FIG. 5, using the secret and/or other data the destination 521 may authenticate the source 520 and vice versa.

At 730, a secure channel is established with the source. For example, referring to FIG. 5, the destination 521 establishes a secure communications channel with the source 520 using a Kchannel key.

At 735, the token is provided to the source. For example, referring to FIG. 5, the destination 521 may provide the sourced 520 with the token in conjunction with an instruction to copy bulk data represented by the token to the destination 521.

At 740, the bulk data is received. For example, referring to FIG. 5, the destination 521 receives the bulk data via the secure channel 530 from the source 520.

At 745, other actions, if any, may be performed. Other actions may include, for example, any other actions described herein as pertaining to the destination.

FIG. 8 is a flow diagram that generally represents exemplary actions that may occur on a source in accordance with aspects of the subject matter described herein. At 805, the actions begin.

At 810, an offload read request may be received from an initiator. For example, referring to FIG. 5, the source 520 may receive an offload read request from the initiator 505. In one implementation, the offload read request may include or be conveyed in conjunction with a secret usable to extend trust as previously indicated.

In another implementation, at 815, the source generates the secret. For example, referring to FIG. 5, the source 520 may generate the secret to send back to the initiator 505.

At 820, the token is sent potentially with a secret depending on implementation. For example, referring to FIG. 5, the source 520 sends the token with the secret to the initiator 505.

At 825, the secret is received from a destination. For example, referring to FIG. 5, the source 520 receives the secret from the destination 521. Receiving the secret may include receiving something derived from the secret that provides evidence that the sender knows the secret.

At 830, a secure channel is established with the destination. For example, referring to FIG. 5, the source 520 establishes a secure connection with the destination 521.

At 835, a token is received from the destination. For example, referring to FIG. 5, the source 520 receives a token from the destination 521. The token may be conveyed with an instruction to send all or a portion of bulk data associated with the token.

At block 840, the bulk data is provided. For example, referring to FIG. 5, the source 520 provides at least some bulk data represented by the token to the destination 521.

At block 845, other actions, if any, may be performed. Other actions may include, for example, receiving a network address of the destination and initiating, by the source, the establishment of a communication channel with the destination. Other actions may also include, for example, any other actions described herein as pertaining to the source.

As can be seen from the foregoing detailed description, aspects have been described related to offload technology. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
sending, by an initiator, a request for a token that represents immutable data as long as the token is valid;
in response to the request, receiving the token from a source offload provider; providing the token to a destination offload provider with an instruction to copy at least a portion of the immutable data from the source offload provider to the destination offload provider, the source offload provider and the destination offload provider being independent of each other; and
extending trust of the initiator to the source offload provider and to the destination offload provider such that the source offload provider trusts the destination offload provider as the source offload provider trusts the initiator and such that the destination offload provider trusts the source offload provider as the destination offload provider trusts the initiator.

2. The method of claim 1, further comprising receiving a secret from the source offload provider in response to the request for a token, the secret to be used in the extending trust of the initiator to the source offload provider and to the destination offload provider.

3. The method of claim 1, further comprising sending, by the initiator, a secret to the source offload provider in conjunction with sending the request for the token, the secret to be used in the extending trust of the initiator to the source offload provider and to the destination offload provider.

4. The method of claim 1, further comprising providing a Kchannel key with which to secure a communications channel between the source offload provider and the destination offload provider.

5. The method of claim 4, further comprising generating the Kchannel key by the initiator.

6. The method of claim 5, further comprising generating an additional Kchannel key for each additional destination offload provider to which data represented by the token is to be copied.

7. The method of claim 4, wherein the Kchannel key is generated by the source offload provider.

8. The method of claim 1, wherein providing the token to a destination offload provider comprises providing the token to an offload write initiator that, in response, sends the token to a destination storage stack to provide to the destination offload provider.

9. The method of claim 1, further comprising providing a network address of the source offload provider to the destination offload provider by embedding the network address in the token.

10. The method of claim 1, further comprising providing a network address of the source offload provider to the destination offload provider by embedding in the token a lookup key usable to find the network address.

11. In a computing environment, a system, comprising:
a destination offload provider comprised of one or more computers and one or more storage devices, the destination offload provider configured to execute actions indicated by computer code, the actions comprising:
receiving, from an initiator, a token that represents immutable data as long as the token is valid, the token generated by a source offload provider that ensures immutability of the data as long as the token is valid, the destination offload provider and the source offload provider being independent of each other; and
receiving, from the initiator, trust data, the trust data for extending trust of the initiator to the source offload provider and to the destination offload provider such that the source offload provider trusts the destination offload provider as the source offload provider trusts the initiator and such that the destination offload provider trusts the source offload provider as the destination offload provider trusts the initiator.

12. The system of claim 11, wherein the destination offload provider receives the token and the trust data in a single message from the initiator.

13. The system of claim 11, wherein the destination offload provider is further configured to execute additional actions indicated by computer code, the additional actions comprising receiving a Kchannel key with which to secure a communications channel between the destination offload provider and the source offload provider.

14. The system of claim 11, wherein the destination offload provider is further configured to execute additional actions indicated by computer code, the additional actions comprising authenticating the source offload provider using the secret.

15. The system of claim 11, wherein the destination offload provider is further configured to execute additional actions indicated by computer code, the additional actions comprising:
receiving a network address of the source offload provider; and
using the network address to establish a communication channel with the source offload provider.

16. The system of claim 11, further comprising the source offload provider configured to authenticate the destination offload provider via an operation that uses the secret.

17. A computer storage device having computer-executable instructions, which when executed perform actions, comprising:
receiving, from an initiator, a request for a token that represents immutable data as long as the token is valid; and
in response to the request, from a source offload provider, sending the token to be provided to a destination offload provider with an instruction and trust data, the instruction to copy at least a portion of the immutable data from the source offload provider to the destination offload provider, the source offload provider and the destination offload provider being independent of each other, the trust data for extending trust of the initiator to the source offload provider and to the destination offload provider such that the source offload provider trusts the destination offload provider as the source offload provider trusts the initiator and such that the destination offload provider trusts the source offload provider as the destination offload provider trusts the initiator.

18. The computer storage device of claim 17, further comprising generating the trust data by the source offload provider and providing the trust data to the initiator.

19. The computer storage device of claim 17, further comprising receiving the trust data from the destination offload provider and in response creating a secure channel with the destination offload provider.

20. The computer storage device of claim 17, further comprising receiving a network address of the destination offload provider and initiating, by the source offload provider, establishment of a communication channel with the destination offload provider.

* * * * *